(12) United States Patent
Chang et al.

(10) Patent No.: US 8,503,573 B2
(45) Date of Patent: Aug. 6, 2013

(54) BITS-TO-SYMBOL MAPPING METHOD FOR 4+12+16 APSK MODULATION

(75) Inventors: Dae Ig Chang, Daejeon (KR); Dongweon Yoon, Seoul (KR); Jaeyoon Lee, Wonju-si (KR)

(73) Assignees: Electronics and Telecommunications Research Institute, Daejeon (KR); Industry-University Cooperation Foundation Hanyang University, Seoul (KR)

( * ) Notice: Subject to any disclaimer, the term of this patent is extended or adjusted under 35 U.S.C. 154(b) by 258 days.

(21) Appl. No.: 12/972,886

(22) Filed: Dec. 20, 2010

(65) Prior Publication Data

US 2011/0150133 A1    Jun. 23, 2011

(30) Foreign Application Priority Data

Dec. 21, 2009    (KR) .................. 10-2009-0127731

(51) Int. Cl.
*H04L 27/04*    (2006.01)

(52) U.S. Cl.
USPC ........... 375/300; 375/286; 375/302; 375/308; 375/295; 375/268; 375/271; 375/279; 375/280; 375/269

(58) Field of Classification Search
USPC ................. 375/300, 286, 302, 308, 295, 268, 375/271, 279, 280, 269
See application file for complete search history.

(56) References Cited

U.S. PATENT DOCUMENTS

| | | | | |
|---|---|---|---|---|
| 7,761,777 | B2 * | 7/2010 | Lee et al. ...................... | 714/780 |
| 2005/0271160 | A1 * | 12/2005 | Eroz et al. ..................... | 375/298 |
| 2011/0122960 | A1 * | 5/2011 | Vitale et al. ................... | 375/261 |
| 2011/0202814 | A1 * | 8/2011 | Zhang et al. .................. | 714/752 |

OTHER PUBLICATIONS

Jae Yoon Lee et al., "New Bit-to-Symbol Mapping for APSK Signaling in a Satellite Communications System", Mosharaka International Conference on Communications, Networking and Information Technology, Dec. 6-8, 2007, pp. 1-4, 2007.

(Continued)

*Primary Examiner* — Siu Lee
(74) *Attorney, Agent, or Firm* — Kile Park Reed & Houtteman PLLC

(57) ABSTRACT

Disclosed is a bits-to-symbol mapping method of 4+12+16 amplitude phase shift keying (APSK) having excellent performance against the non-linearity of a high power amplifier. According to the present invention A bits-to-symbol mapping method of 4+12+16 APSK modulation, comprising: representing 32 symbols of the 4+12+16 APSK modulation by a polar coordinate and arranging the 32 symbols by a size of θ while giving priority to a symbol having a small signal size when the size of θ of two or more symbols are same; grouping the arranged 32 symbols into 4 groups according to quadrant regions where the symbols are located; and allocating bits so that the same bits are allocated to the symbols belonging to the same region for each region with respect to each of the first to fifth bits of the symbols grouped into four regions.

8 Claims, 15 Drawing Sheets

OTHER PUBLICATIONS

J. Lee et al., "New Bits-to-Symbol Mapping for 32 APSK over Nonlinear Satellite Channels", IEICE Transactions on Communications, Nov. 1, 2009, vol. E92-B, No. 11, pp. 3384-3388.

J. Lee et al., "Error Performance Analysis for 4+12+16 APSK Signal over a Satellite Channel", Fourth International Conference on Digital Telecommunications, Jul. 20-25, 2009, ICDT '09., pp. 93-95.

R.D. Gaudenzi et al., "Turbo-coded APSK Modulations Design for Satellite Broadband Communications", International Journal of Satellite Communications and Networking, vol. 24 (2006), pp. 261-281, May 19, 2006.

Jong Cheon Park, "BER Analysis for APSK Signaling over Nonlinear AWGN Channels" Department of Electronics and Computer Eng., The Graduate School of Hanyang University. Feb. 2008. 55 pages.

* cited by examiner

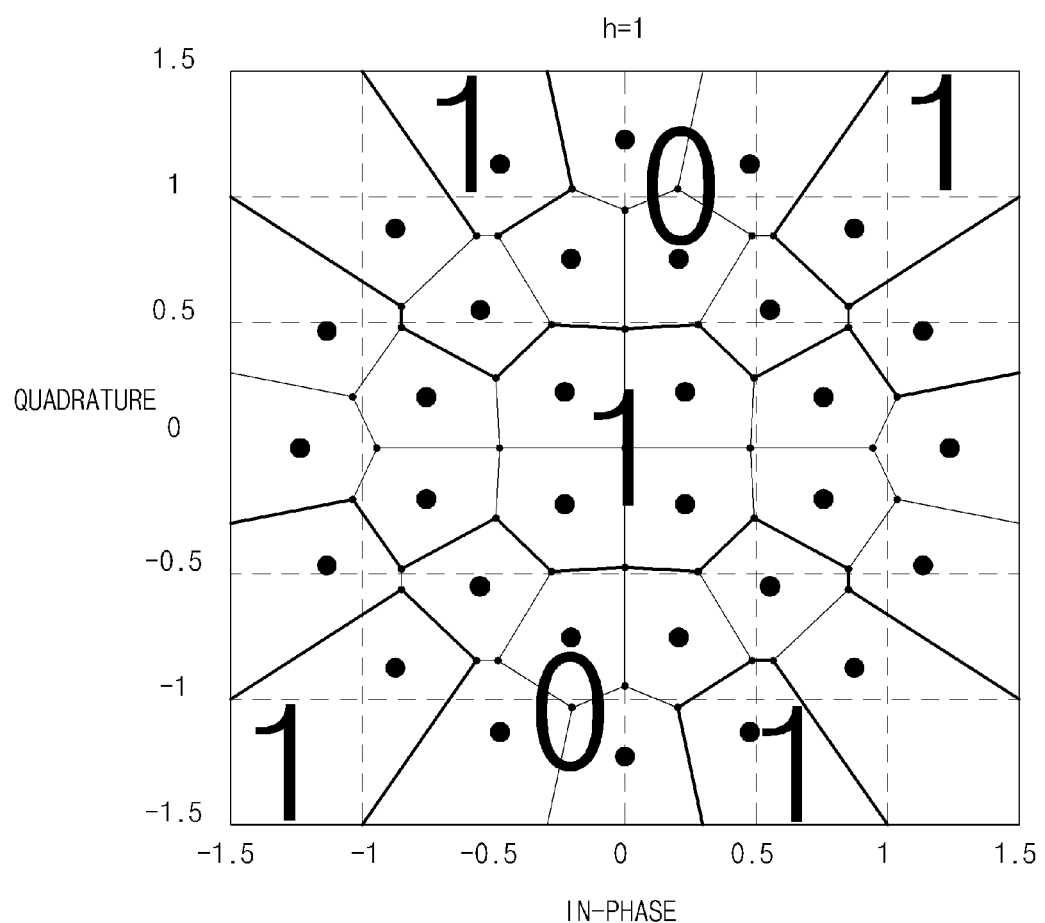

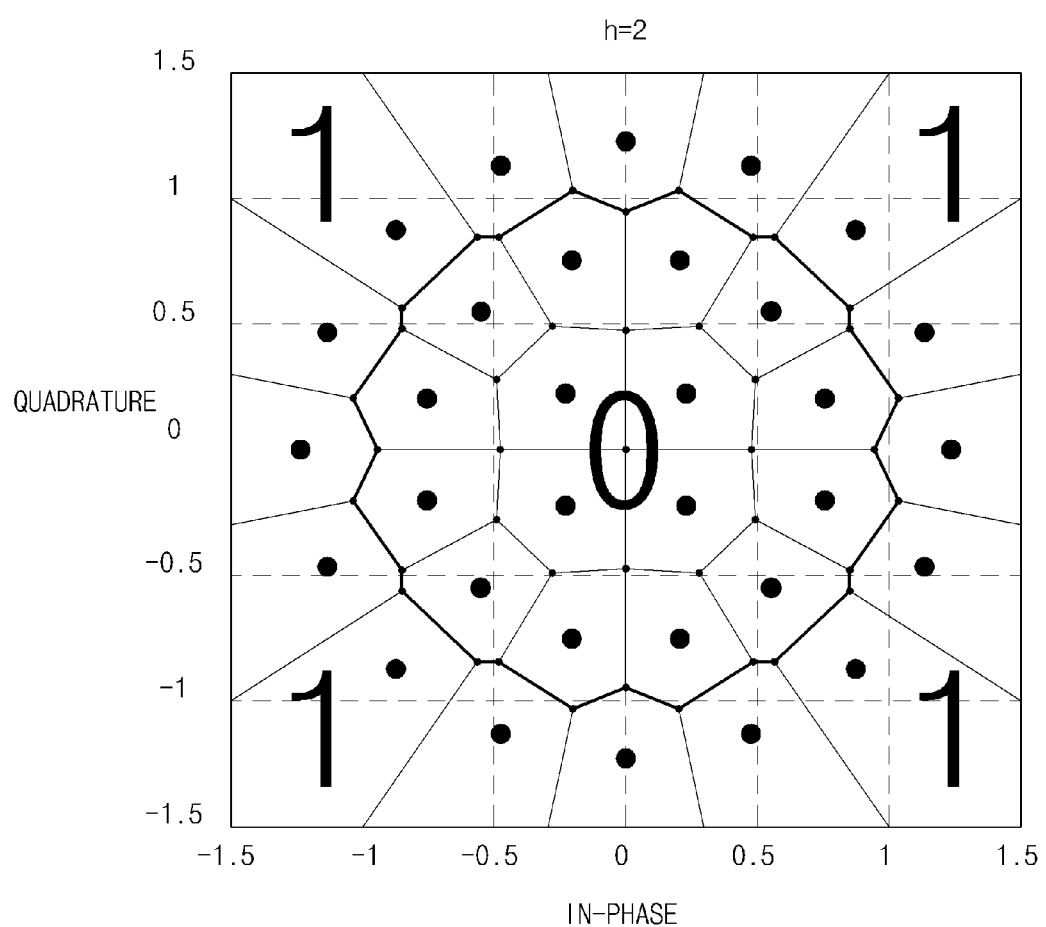

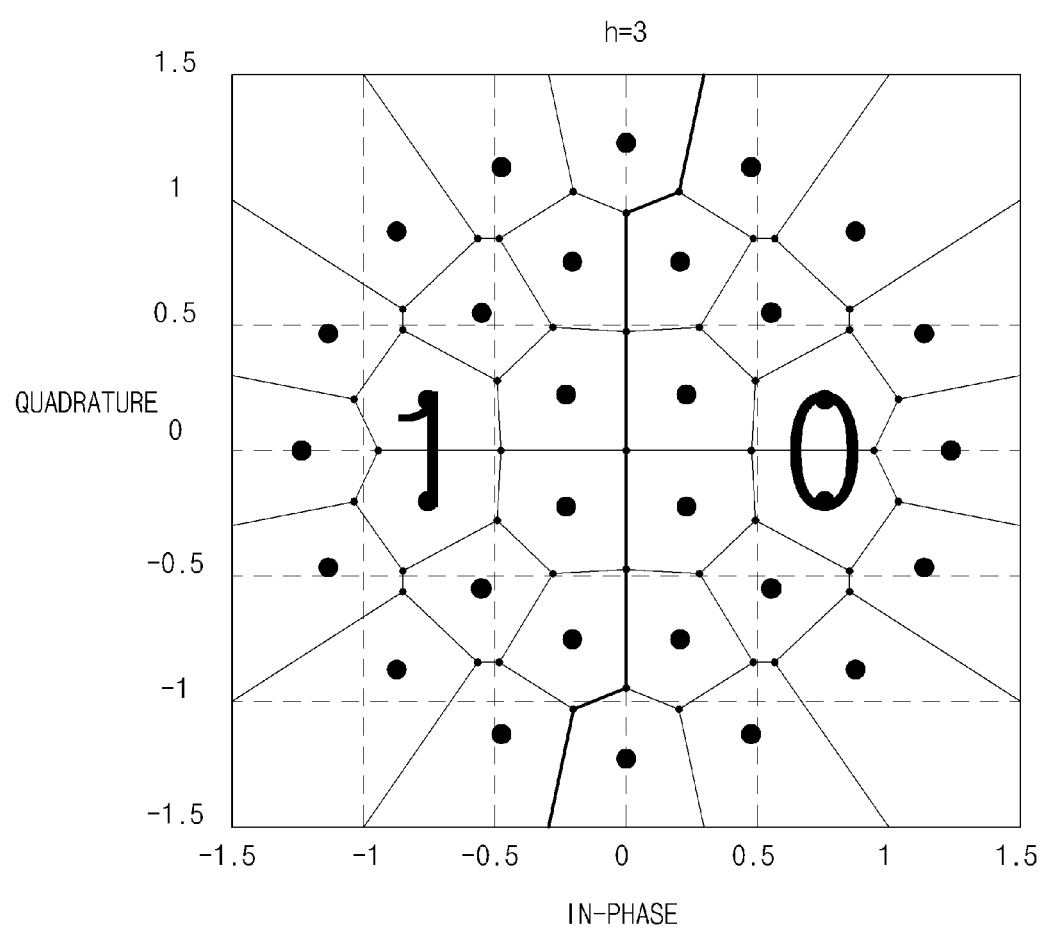

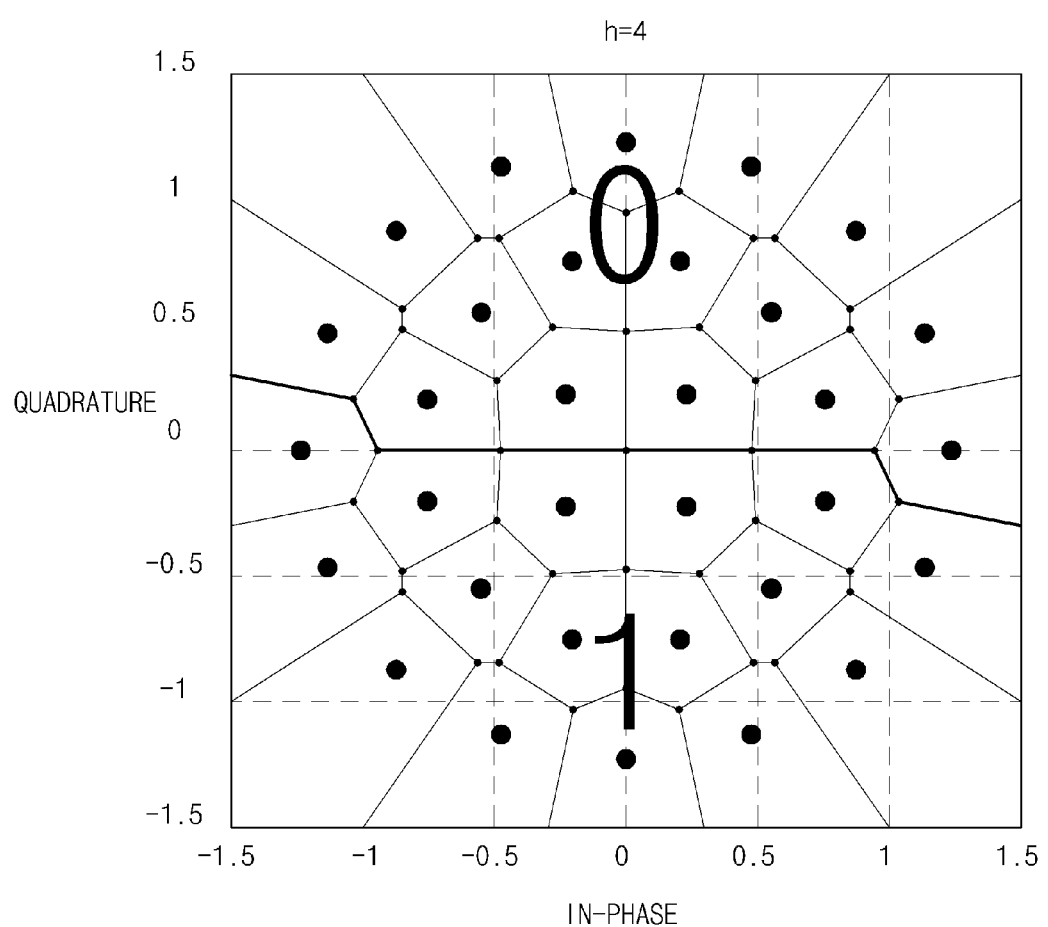

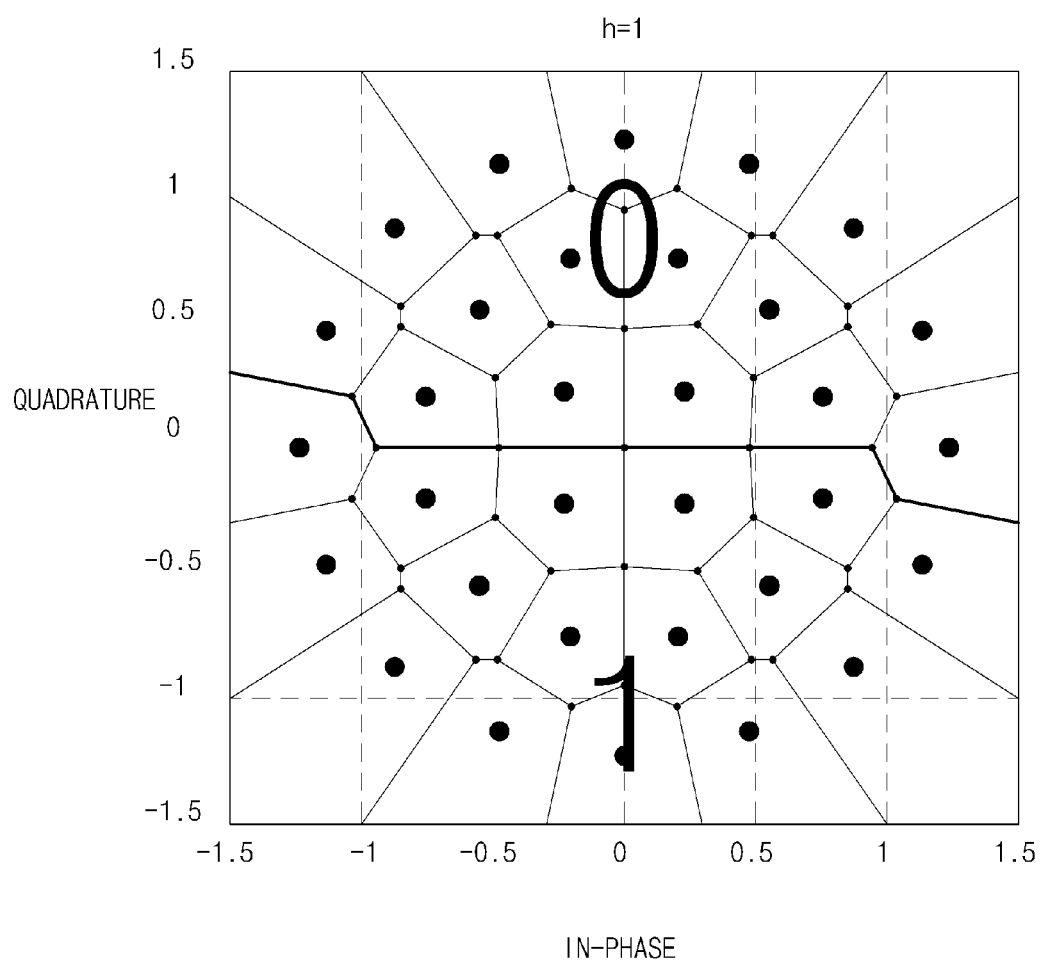

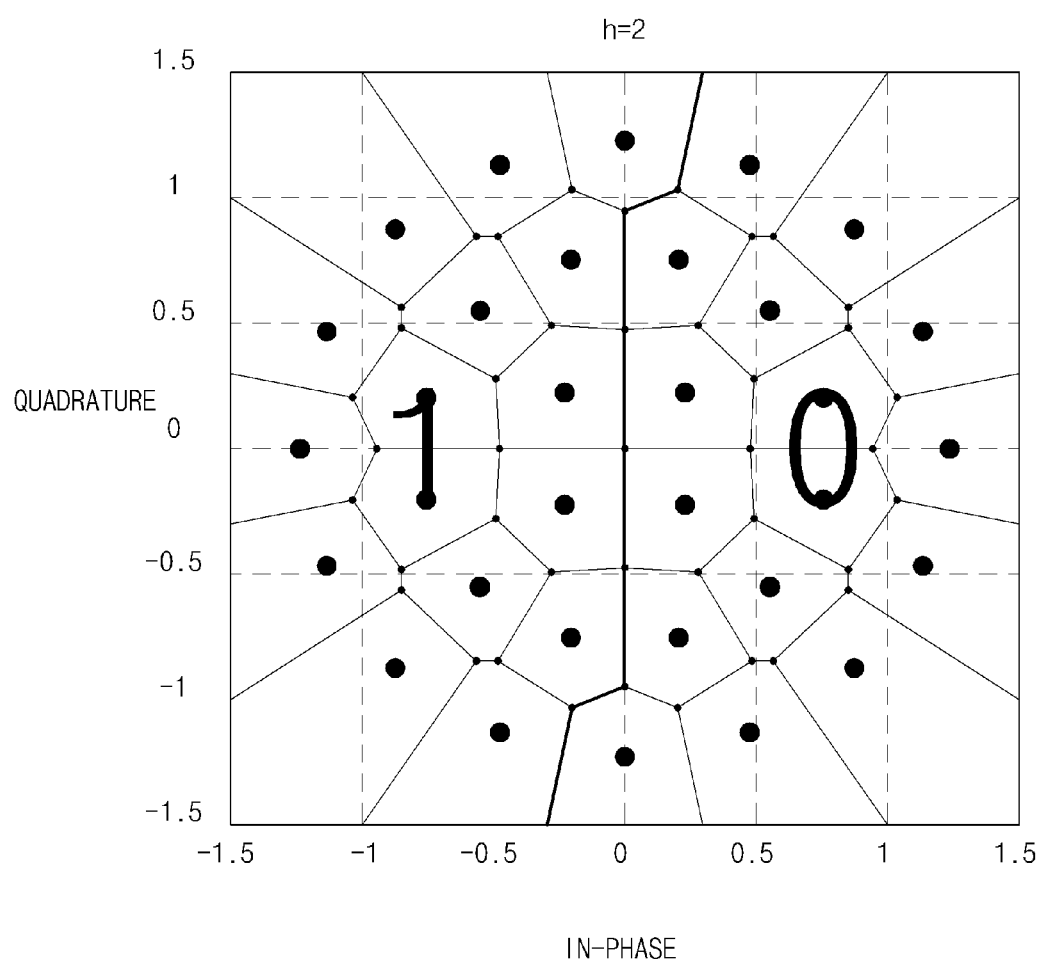

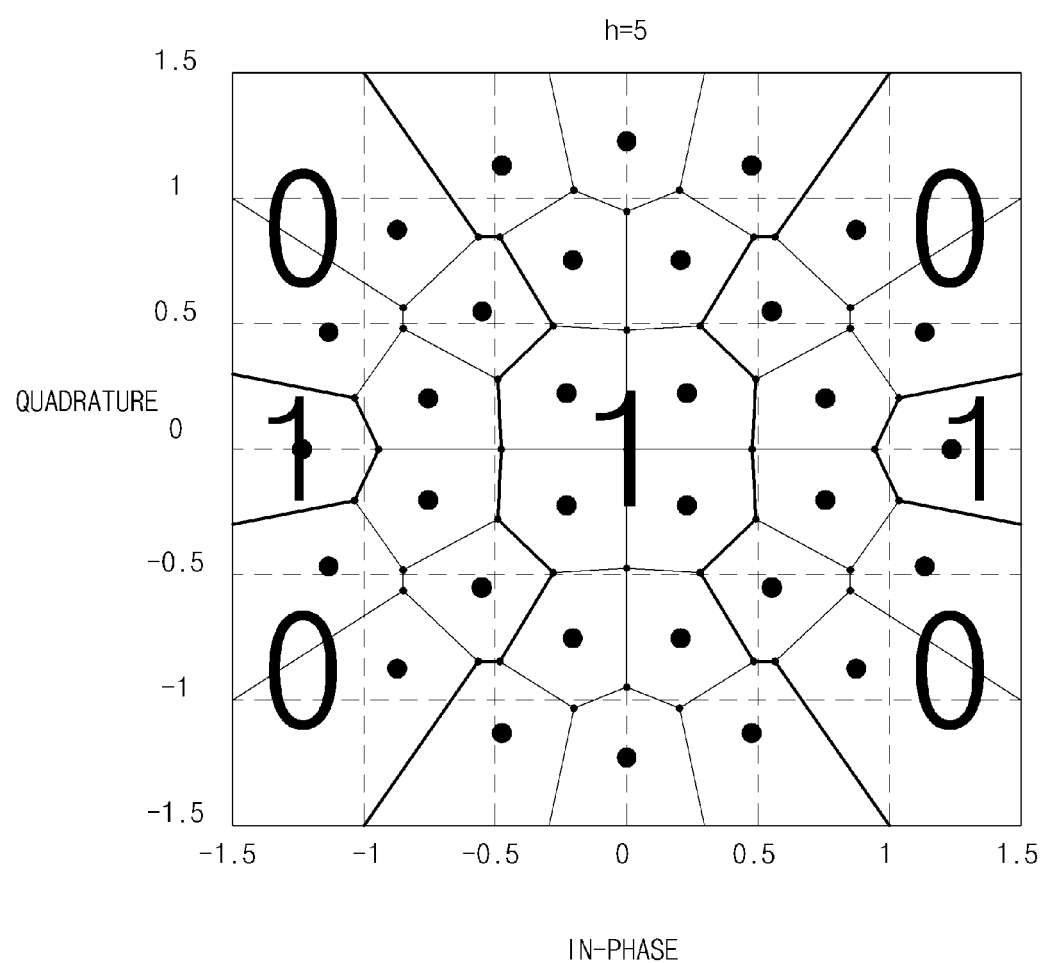

BITS-TO-SYMBOL MAPPING METHOD FOR 4+12+16 APSK MODULATION

CROSS-REFERENCE TO RELATED APPLICATIONS

This application claims priority under 35 U.S.C. §119 to Korean Patent Application No. 10-2009-0127731, filed on Dec. 21, 2009, in the Korean Intellectual Property Office, the disclosure of which is incorporated herein by reference in its entirety.

TECHNICAL FIELD

The present disclosure relates to a bits-to-symbol mapping method for 4+12+16 amplitude phase shift keying (APSK) modulation, and more particularly, to a bits-to-symbol mapping algorithm for the 4+12+16 APSK having excellent performance against non-linearity of a high power amplifier.

BACKGROUND

In a digital video broadcasting-satellite 2 (DVB-S2) standard for a broadband satellite communication broadcast convergence service suitable for a Ka band, bits-to-symbol mapping for 4+12+16 APSK modulation is as shown in FIG. 1.

In the bits-to-symbol mapping, mapping regions for each bit ($b_h$, h=1, 2, ..., 5) are shown in FIGS. 2A to 2E. At this time the left-most bit is a first bit ($b_1$), that is, a most significant bit (MSB).

The above-mentioned related art has several problems. Since the 4+12+16 APSK modulation of the DVB-S2 is impossible to perform a gray bits-to-symbol mapping, the bit error probability performance may be varied according to the bits-to-symbol mapping algorithm and since signal constellation is formed of three different amplitudes, the bit error performance is changed due to an effect on non-linearity of the high power amplifier.

As can be appreciated from FIGS. 2A to 2E, the bits-to-symbol mapping proposed in the existing standards applies a decision region-based bits-to-symbol algorithm to each bit. However, the bits-to-symbol mapping type of each bit is not symmetrical to I/Q axes and a Hamming distance between adjacent symbols is up to 3 as can be appreciated from FIG. 1. As shown in FIG. 3, when a set of signal constellations on an inner circle is $s_I=\{s_4, s_{12}, s_{20}, s_{28}\}$, a set of signal constellations on an intermediate circle is $s_M=\{s_2, s_5, s_8, \ldots, s_{32}\}$, and a set of signal constellations on an outer circle is $s_O=\{s_1, s_3, s_6, \ldots, s_{31}\}$, the maximum Hamming distance according to the standard bits-to-symbol algorithm shown in FIG. 1 depends on the following Equation 1.

$$H\_d(s_5,s_6)=H\_d(s_{21},s_{22})=3 \quad \text{[Equation 1]}$$

Since the bit error probability is inversely proportional to the Hamming distance between adjacent symbols, the Hamming distance of 3 is a direct factor of the error performance deterioration. FIG. 3 shows the signal constellations according to the 4+12+16 APSK modulation using input backoff of 9 dB and the effect of the non-linear high power amplifier (HPA), and the change in the signal constellation and the decision boundary accordingly. When there is non-linearity due to the AM/AM and AM/PM distortions of the high power amplifier, it can be appreciated from FIG. 3 that the positions of the signal constellations are changed. In other words, it can be appreciated that the signal constellations of the intermediate circle approaches the signal constellations of the outer circle. This means that a Euclidean distance is short and the shortened Euclidean distance causes the degradation of the error performance. In particular, reviewing the Euclidean distance of the signal constellations having the above-mentioned Hamming distance at maximum of 3, it can be appreciated that the Euclidean distance thereof is closest. This is a main factor of the deterioration of the entire bit error performance.

SUMMARY

The present invention proposes to solve the above problem. It is an object of the present invention to improve bit error performance by performing bits-to-symbol mapping so that a Hamming distance between signal constellations approaching each other due to non-linear characteristic of HPA becomes minimal.

In order to achieve the above-mentioned objects, there is provided a bits-to-symbol mapping method of 4+12+16 APSK modulation, including: representing 32 symbols of the 4+12+16 APSK modulation by a polar coordinate and arranging the 32 symbols by a size of θ while giving priority to a symbol having a small signal size when the size of θ of two or more symbols are same; grouping the arranged 32 symbols into 4 groups according to quadrant regions where the symbols are located; and allocating bits so that the same bits are allocated to the symbols belonging to the same region for each region with respect to each of the first to fifth bits of the symbols grouped into four regions.

Preferably, when allocating the bits, bits may be allocated so that the bits-to-symbol mapping of the third to the fifth bits of each symbol are symmetrical to Quadrature axis and In-phase axis, the bit difference between all the adjacent symbols forming a decision boundary is 1 bit or 2 bits, and a Hamming distance between all the adjacent symbols is a minimum value.

According to an exemplary embodiment of the present invention, the bit error performance can be improved by performing the bits-to-symbol mapping so that the Hamming distance between the signal constellations approaching each other due to the non-linear characteristic of the HPA becomes minimal.

According to an exemplary embodiment of the present invention, the bit difference between all the adjacent symbols forming the decision boundary in the bits-to-symbol mapping of the 4+12+16 APSK modulation is only 1 bit or 2 bits and in particular, the Hamming distance of two pairs of signals positioned on a diagonal line having a large Hamming distance is 1, which is the minimum distance.

In addition, the mapping type of the third, fourth, and fifth bits meets the I/Q symmetry, thereby making it possible to further simplify the structure of the receiver and reduce the load of the receiver.

Other features and aspects will be apparent from the following detailed description, the drawings, and the claims.

BRIEF DESCRIPTION OF THE DRAWINGS

FIGS. 2A to 2E are diagrams showing a bits-to-symbol algorithm proposed in the DVB-S2 standard;

FIGS. 4A to 4F are diagrams showing a bits-to-symbol mapping algorithm according to an exemplary embodiment of the present invention;

DETAILED DESCRIPTION OF EMBODIMENTS

Figure 1:
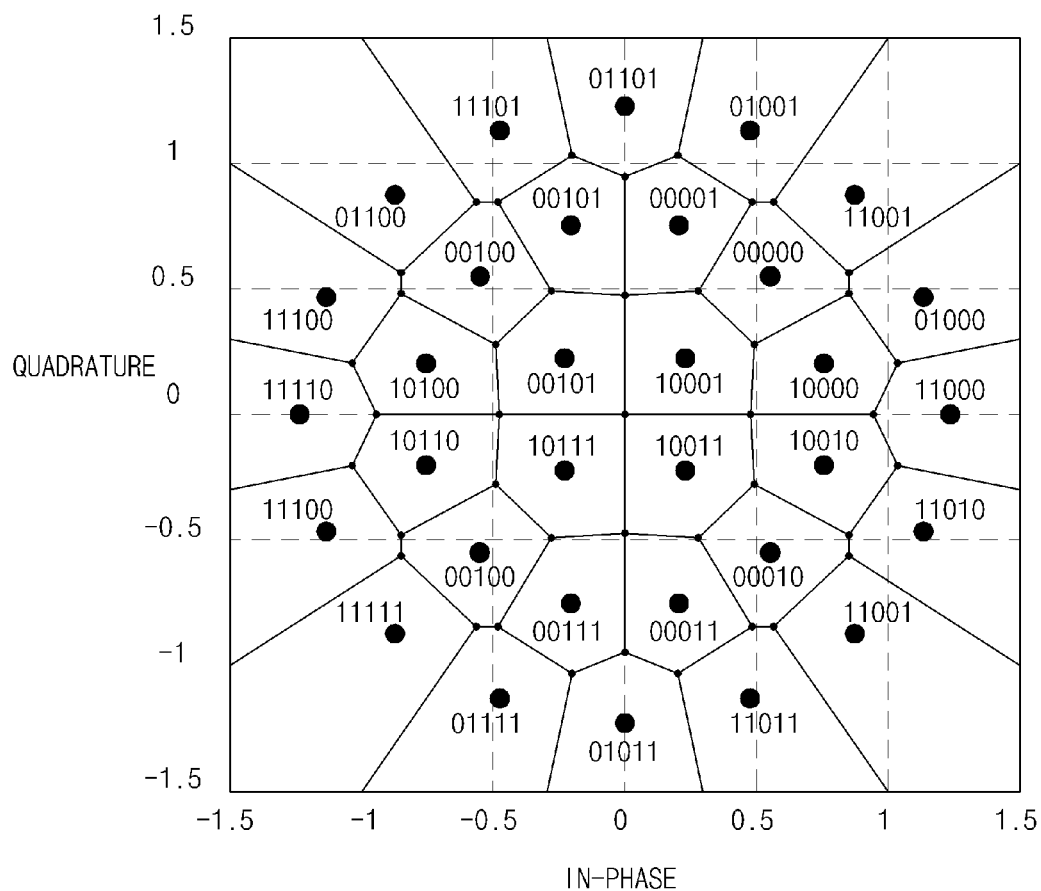
FIG. 1 is a diagram showing bits-to-symbol mapping of 4+12+16 APSK proposed in a DVB-S2 standard.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Exemplary embodiments of the present invention will be described below with reference to the accompanying drawings.

According to the present invention, bit error performance is improved by performing bit-to-symbol mapping so that a Hamming distance between the signal constellations approaching each other due to non-linear characteristic of HPA becomes minimal.

Figure 3:
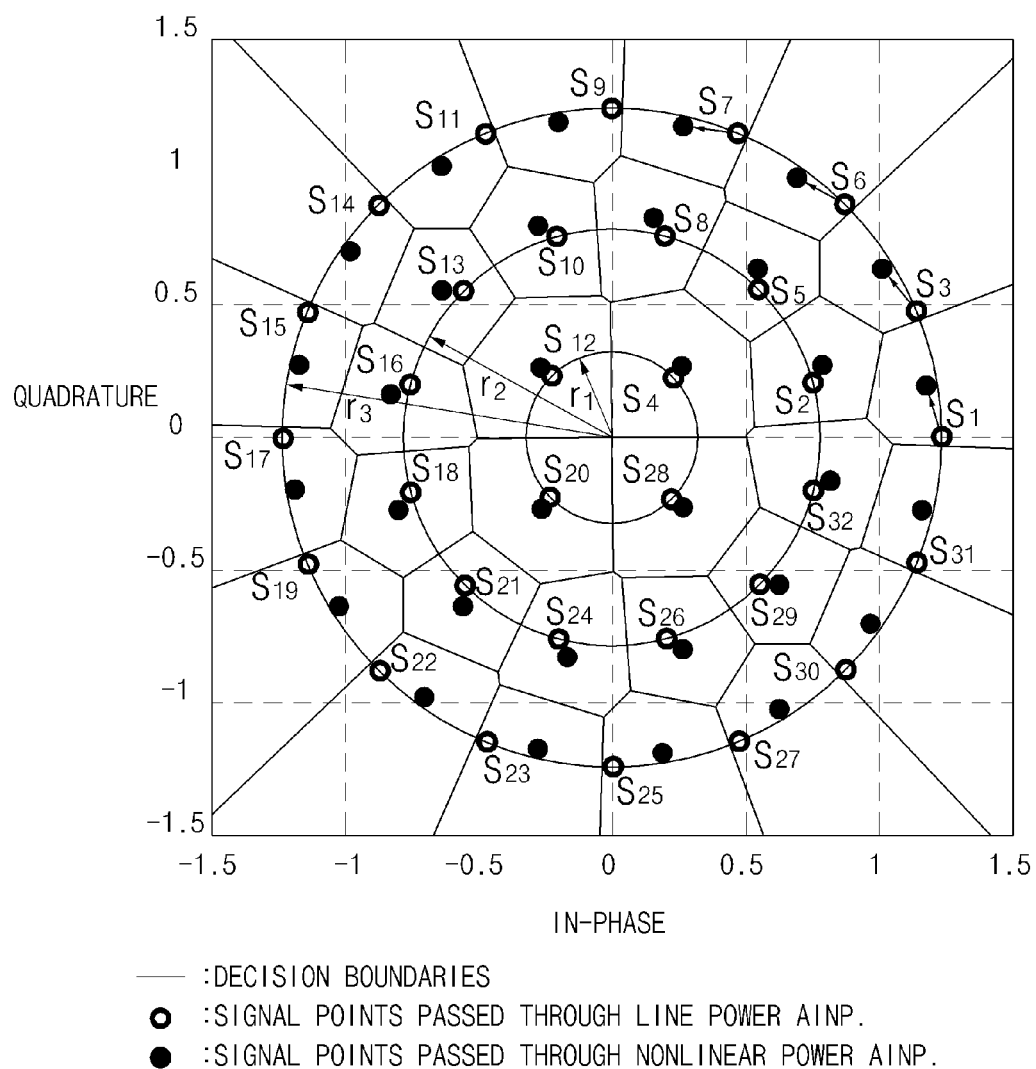
FIG. 3 is a diagram showing signal constellations of the 4+12+16 APSK modulation and an effect of a non-linear high power amplifier (HPA), and the change in the signal constellations and the decision boundary accordingly.

In FIG. 3, 32 symbols of 4+12+16 APSK modulation are marked in a polar coordinate system, and it can be expressed as the following Equation 2 when the symbols are arranged by a size of θ.

$$s=[s_1, s_2, \ldots, s_{32}], s_i = r_i e^{j\theta_i}, i=1, 2, \ldots, 32 \ s. \ t.$$
$$\theta_i \leq \theta_{i+1}, 0 \leq \theta < 2\pi \qquad \text{[Equation 2]}$$

Herein, if the θ sizes of the symbols are equal to each other, the symbol having a small signal size $r_i$ is given a priority.

Figure 4C:
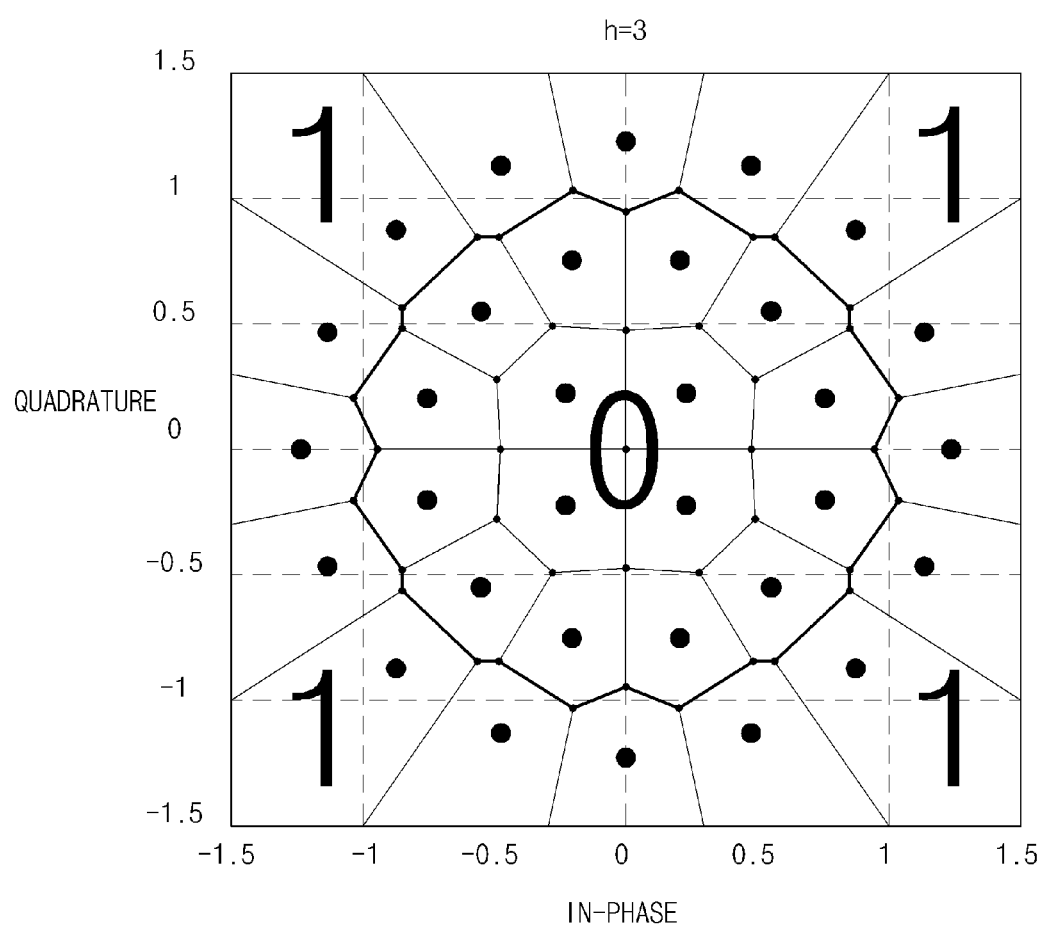
Figure 4D:
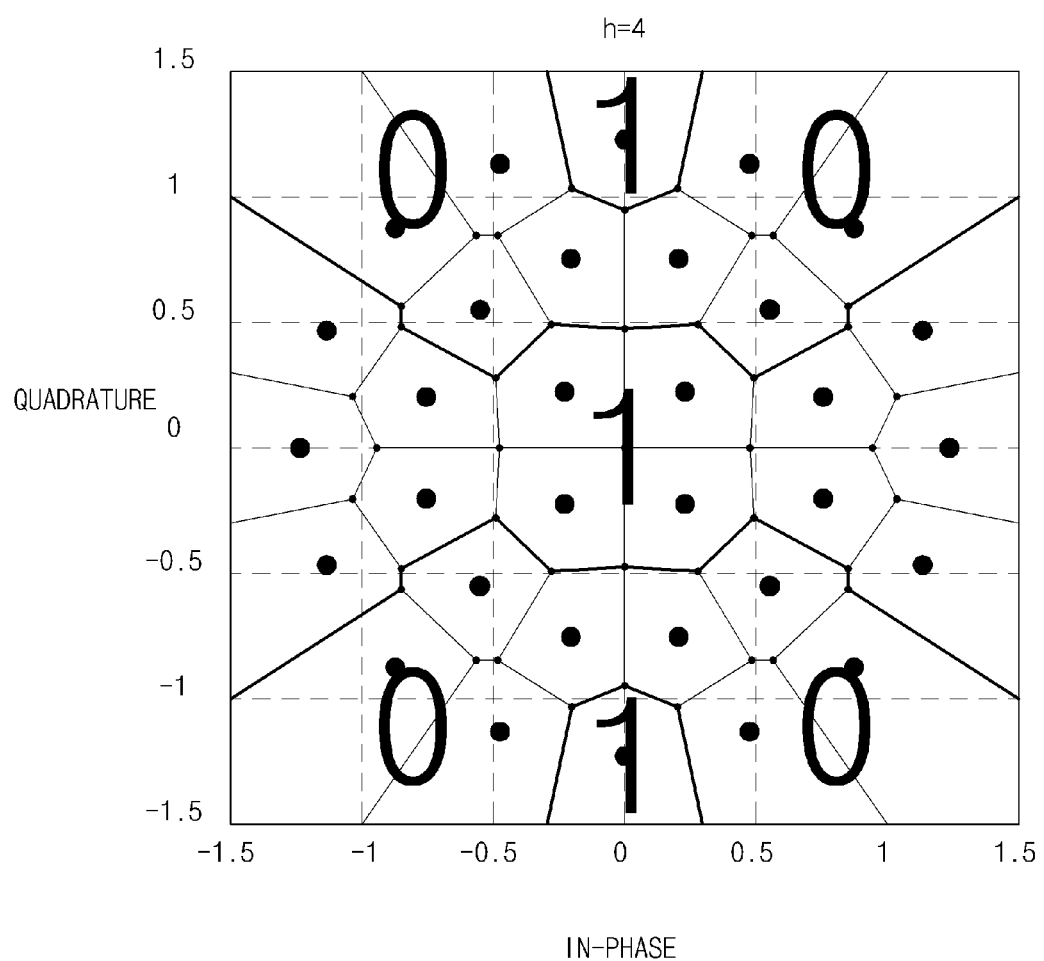
Figure 4F:
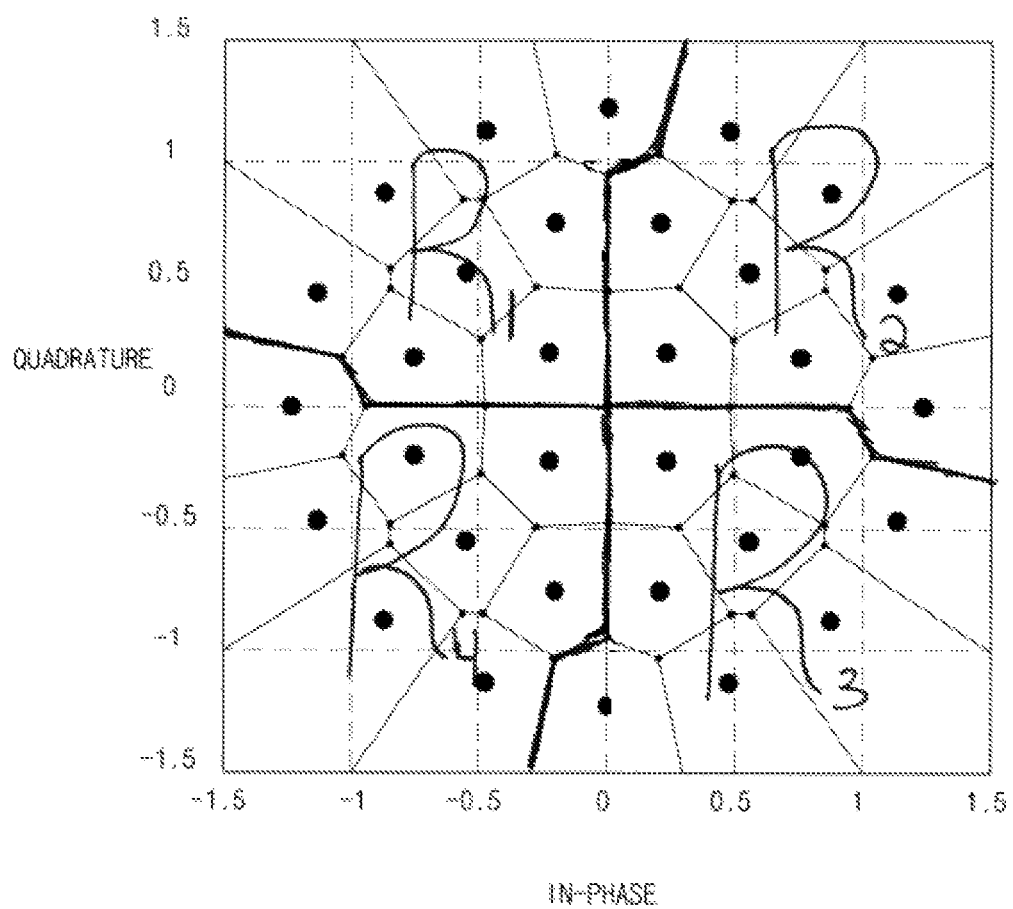

Next, the 32 symbols of a defined order which are in the possible same quadrant are grouped into 8, which are divided into four regions ($R_k$, k=1,2,3,4), such as illustrated in FIG. 4F, according to the following Equation 3.

$$R_k = [s_{8k-7} \ s_{8k-6} \ s_{8k-5} \ s_{8k-4} \ s_{8k-3} \ s_{8k-2} \ s_{8k-1} \ s_{8k}], k=1, \ldots, 4 \qquad \text{[Equation 3]}$$

Here, $R_k$ represents a region having 8 symbols grouped as positioned in a k-quadrant.

Next, bits are allocated to symbols grouped into four regions, respectively. FIGS. 4A to 4F show the bit-to-symbol mapping according to the exemplary embodiment of the present invention by using the decision boundary. As shown in FIGS. 4A to 4F, each bit is allocated by dividing the region.

For the first bit ($b_{i,1}$), bit 0 is allocated to symbols in a $R_1$, $R_2$ region and bit 1 to symbols in a $R_3$, $R_4$ region as shown in FIG. 4A. For the second bit ($b_{i,2}$), bit 0 is allocated to symbols in a $R_1$, $R_4$ region and bit 1 to symbols in a $R_2$, $R_3$ region as shown in FIG. 4B. Herein, $b_{i,h}$ represents a h-th bit of a i-th symbol. This is represented by the following Equations 4 and 5.

First bit (h=1)

$$b_{i,h}=0, \text{ if } s_i \in \{R_1 \cup R_2\}, i=1, 2, \ldots, 32$$

$$b_{i,h}=1, \text{ if } s_i \in \{R_3 \cup R_4\}, i=1, 2, \ldots, 32 \qquad \text{[Equation 4]}$$

Second bit (h=2)

$$b_{i,h}=0, \text{ if } s_i \in \{R_1 \cup R_4\}, i=1, 2, \ldots, 32$$

$$b_{i,h}=1, \text{ if } s_i \subset \{R_2 \cup R_3\}, i=1, 2, \ldots, 32 \qquad \text{[Equation 5]}$$

After the third bit ($b_{i,3}$), bits are allocated based on the element size of the signal set $R_1$. When the set rearranged by the size $r_i$ of the signals belonging to $R_1$ in an ascending order is A=[$\alpha_1 \ \alpha_2 \ldots \alpha_8$], 0 is allocated to the third bit when the size $r_i$ of a signal belongs to the set $\{\alpha_1 \ldots \alpha_4\}$ of smaller size and 1 is allocated 1 when the size $r_i$ of a signal belongs to the set $\{\alpha_5 \ldots \alpha_8\}$ of a larger size. The mapping for the third bit is shown in FIG. 4C and is represented by the following Equation 6.

Third bit (h=3)

$$A=\text{sort}(r_i|r_i \in R_1)=[\alpha_1 \ \alpha_2 \ldots \alpha_8] \ b_{i,h}=0, \text{ if } r_i \in \{\alpha_1 \ldots \alpha_4\}, i=1, 2, \ldots, 32 \ b_{i,h}=1, \text{ otherwise} \qquad \text{[Equation 6]}$$

For the fourth bit ($b_{i,4}$) and the fifth bit ($b_{i,5}$), bits are allocated to each symbol so that the allocated bits-to-symbol mapping is symmetrical as shown in FIGS. 4D and 4E. The bits-to-symbol mapping of the fourth bit is performed by comparing the Quadrature axis size ($r_{i\_Q}$) of all the signals with the size $r_i$ ($r_{i\_I}$, $r_{i\_Q}$) of signals belonging to $R_1$ and the bits-to-symbol mapping of the fifth bit is performed by comparing an In-phase axis size ($r_{i\_I}$) of all the signals with the size $r_i$ ($r_{i\_I}$, $r_{i\_Q}$) of the signals belonging to $R_1$.

In other words, when the set rearranged by the Quadrature axis size $r_{i\_Q}$ of the signals belonging to $R_1$ in an ascending order is B=[$b_1 \ b_2 \ldots b_8$], 0 is allocated to the fourth bit when the Quadrature axis size $r_{i\_Q}$ of a signal belongs to the set $\{b_5 \ldots b_8\}$ of a larger size, and otherwise, 1 is allocated.

The fifth bit is allocated in a manner similar to the fourth bit. When the set rearranged by the in-phase axis size $r_{i\_I}$ of the signals belonging to $R_1$ in an ascending order is c=[$c_1 \ c_2 \ldots c_8$], 0 is allocated when the In-phase axis size $r_{i\_I}$ of a signal belonging to the set $\{c_4 \ldots c_7\}$ of a larger size other than the largest In-phase axis size, and otherwise, 1 is allocated.

The mapping for the fourth bit and the fifth bit is represented by the following Equations 7 and 8.

Fourth bit (h=4)

$$B=\text{sort}(r_{i\_Q}|r_i \in R_1)=[b_1 \ b_2 \ldots b_8] \ b_{i,h}=0, \text{ if } r_{i\_Q} \in \{b_5 \ldots b_8\}, i=1, 2, \ldots, 32 \ b_{i,h}=1, \text{ otherwise} \qquad \text{[Equation 7]}$$

Fifth bit (h=5)

$$C=\text{sort}(r_{i\_I}|r_i \in R_1)=[c_1 \ c_2 \ldots c_8] \ b_{i,h}=0, \text{ if } r_{i\_I} \in \{c_4 \ldots c_7\}, i=1, 2, \ldots, 32 \ b_{i,h}=1, \text{ otherwise} \qquad \text{[Equation 8]}$$

Figure 5:
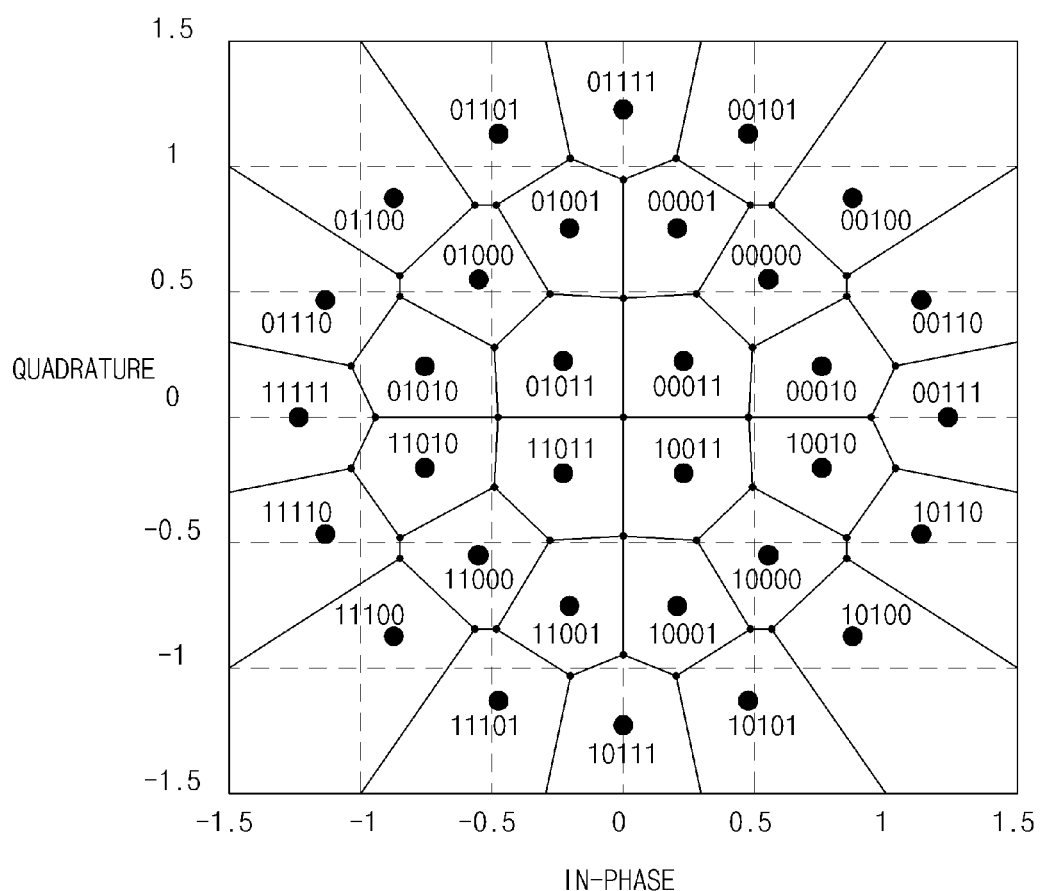
FIG. 5 is a diagram showing bits-to-symbol mapping according to an exemplary embodiment of the present invention.

The bits-to-symbol mapping structure allocated to each signal according to the above-mentioned manner is shown in FIG. 5. As can be appreciated from FIG. 5, in the bits-to-symbol mapping of the 4+12+16 APSK modulation according to the exemplary embodiment of the present invention, the bit difference between all the adjacent symbols forming the decision boundary is only 1 bit or 2 bits, and in particular, the Hamming distance of two pairs of signals having a large Hamming distance is 1, which is the minimum distance as in the following Equation 9.

$$H\_d(s_5, s_6) = H\_d(s_{21}, s_{22}) = 1 \qquad \text{[Equation 9]}$$

Figure 2E:
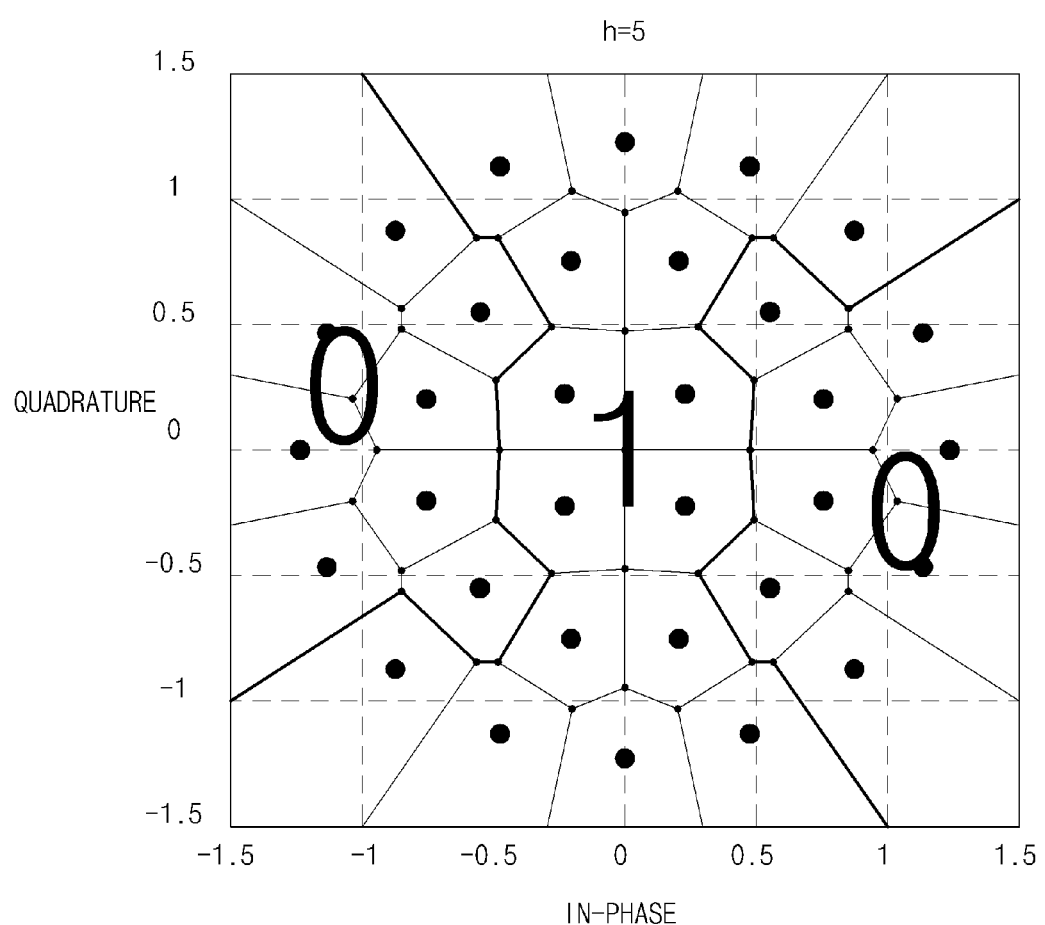

In the standard bits-to-symbol mapping, only the second bit ($b_2$) meets the I/Q symmetry as shown in FIG. 2B, while in the bits-to-symbol mapping according to the exemplary embodiment of the present invention, the mapping type of the third, fourth, and fifth bits $b_3$, $b_4$, and $b_5$ meet the I/Q symmetry as shown in FIGS. 4C to 4E. The I/Q symmetry can further simplify the structure of the receiver and reduce the load of the receiver at the time of the signal demodulation.

Figure 6:
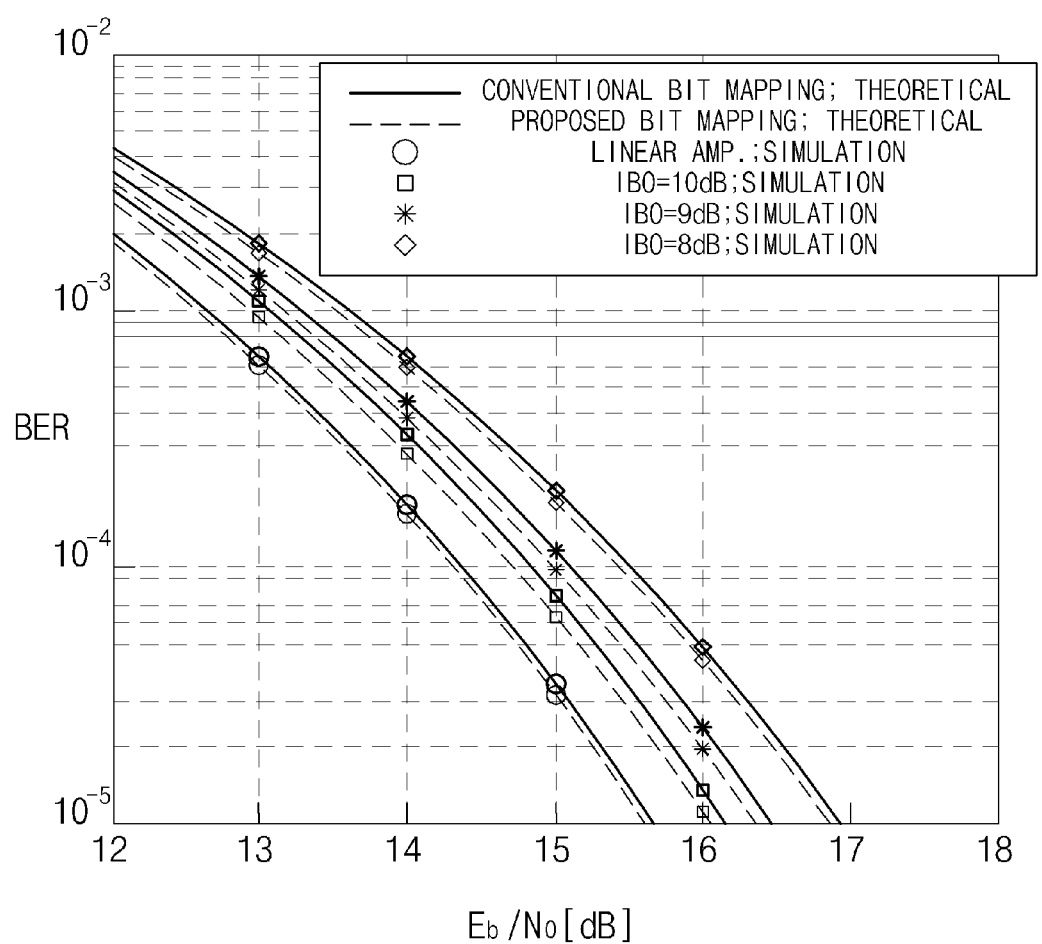
FIG. 6 is a graph showing BER performance of the 4+12+16 APSK modulation according to an exemplary embodiment of the present invention.

FIG. 6 is a graph showing the bit error performances of the existing standard and an exemplary embodiment of the present invention are applied. At this time, the IBO of the high power amplifier considers 8, 9, 10 dB based on 9 dB proposed in the DVB-S2 and compares the numerical results and the simulation results.

As can be appreciated from FIG. 6, the bits-to-symbol mapping according to the exemplary embodiment of the present invention has superior bit error performance iii all cases than that of the existing standard regardless of the linear amplifier and the non-linear amplifier. In particular, it can be appreciated that the bit error performance is far better at the IBO of about 9 -10 dB.

Therefore, when the bits-to-symbol mapping algorithm of the 4+12+16 APSK according to the exemplary embodiment of the present invention is applied to the DVB-S2 system, it can reduce performance deterioration for non-linearity of the high power amplifier and can further simplify the structure of the receiver to reduce the load as compared to the existing system, such that it is expected to be usefully used in a system for satellite communication and space communication.

The bits-to-symbol mapping of the 4+12+16 APSK according to the exemplary embodiment of the present invention can be implemented as computer readable codes in a recording medium readable by a computer. The computer-readable recording media includes all types of recording apparatuses in which data readable by a computer system is stored. Examples of the computer-readable recording media include a ROM, a RAM, a CD-ROM, a magnetic tape, a floppy disk, an optical data storage, etc., and in addition, include a recording medium implemented in the form of a carrier wave (for example, transmission through the Internet). The computer-readable recording media are distributed on computer systems connected through the network, and thus the computer-readable recording media may be stored and executed as the computer-readable code by a distribution scheme.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computer-implemented bits-to-symbol mapping method of 4+12+16 APSK modulation, the method comprising executing computer program code instructions to cause one or more computer processor to:
   represent 32 symbols of the 4+12+16 APSK modulation by a polar coordinate and arranging the 32 symbols by a size of θ while giving priority to a symbol having a small signal size when the size of θ of two or more symbols are same;
   group the arranged 32 symbols into 4 groups according to quadrant regions where the symbols are located; and
   allocate bits so that a same bit is allocated to symbols belonging to the same quadrant region for each region with respect to each of first to fifth bits of the symbols grouped into four regions; wherein bits are allocated so that the bits-to-symbol mapping of the third to the fifth bits of each symbol are symmetrical to Quadrature axis and In-phase axis.

2. The method of claim 1, wherein the allocating the bits allocates bits so that the bit difference between all the adjacent symbols forming a decision boundary is 1 bit or 2 bits.

3. The method of claim 1, wherein the allocating the bits allocates bits so that a Hamming distance between all the adjacent symbols becomes a minimum value.

4. The method of claim 1, wherein the allocating the bits allocates bits according to following Equations 10 to 14 for the first to fifth bits, respectively $$b_{i,h}=0, \text{ if } s_i \in \{R_1 \cup R_2\}, i=1, 2, \ldots, 32$$

$$b_{i,h}=1, \text{ if } s_i \in \{R_3 \cup R_4\}, i=1, 2, \ldots, 32 \quad \text{[Equation 10]}$$

$$b_{i,h}=0, \text{ if } s_i \in \{R_1 \cup R_4\}, i=1, 2, \ldots, 32$$

$$b_{i,h}=1, \text{ if } s_i \in \{R_2 \cup R_3\}, i=1, 2, \ldots, 32 \quad \text{[Equation 11]}$$

$$A=\text{sort }(r_i|r_i \in R_1)=[\alpha_1 \alpha_2 \ldots \alpha_8]$$

$$b_{i,h}=0, \text{ if } r_i \in \{\alpha_1 \ldots \alpha_4\}, i=1, 2, \ldots, 32$$

$$b_{i,h}=1, \text{ otherwise} \quad \text{[Equation 12]}$$

$$B=\text{sort}(r_{i\_Q}|r_i \in R_1)=[b_1 b_2 \ldots b_8].$$

$$b_{i,h}=0, \text{ if } r_{i\_Q} \in \{b_5 \ldots b_8\}, i=1, 2, \ldots, 32$$

$$b_{i,h}=1, \text{ otherwise} \quad \text{[Equation 13]}$$

$$C=\text{sort }(r_{i\_I}|r_i \in R_1)=[c_1 c_2 \ldots c_8]$$

$$b_{i,h}=0, \text{ if } r_{i\_I} \in \{c_4 \ldots c_7\}, i=1, 2, \ldots, 32$$

$$b_{i,h}=1, \text{ otherwise} \quad \text{[Equation 14]}$$

(where $s_i$ represents an i-th symbol, $b_{i,h}$ represents an h-th symbol of the i-th symbol, and $R_k$ is defined by following Equation 15, $$R_k=[s_{8k-7} s_{8k-6} s_{8k-5} s_{8k-4} s_{8k-3} s_{8k-3} s_{8k-1} s_{8k}], k=1, \ldots, 4 \quad \text{[Equation 15]}$$

$r_i$, $r_{i\_Q}$, $r_{i\_I}$ represent a size of the i-th signal, a Quadrature axis size of the i-th signal, and an In-phase axis size of the i-th signal, respectively, and $$A=[a_1, a_2 \ldots a_8], B=[b_1 b_2 \ldots b_8], C=[c_1 c_2 \ldots c_8]$$

represent a set rearranged by a size r, of signals belonging to $R_1$, a Quadrature axis size $r_{i\_Q}$, and an In-phase axis size $r_i$, respectively, in an ascending order).

5. A non-transitory computer-readable storage medium having stored thereon computer-executable instructions for a bits-to-symbol mapping method of 4+12+16 APSK modulation method that, in response to being executed by a computing device, cause the computing device to perform operations comprising:
   representing 32 symbols of the 4+12+16 APSK modulation by a polar coordinate and arranging the 32 symbols by a size of θ while giving priority to a symbol having a small signal size when the size of θ of two or more symbols are same;
   grouping the arranged 32 symbols into 4 groups according to quadrant regions where the symbols are located; and
   allocating bits so that a same bits is allocated to the symbols belonging to the same quadrant region for each region with respect to each of the first to fifth bits of the symbols grouped into four regions; wherein bits are allocated so that the bits-to-symbol mapping of the third to the fifth bits of each symbol are symmetrical to Quadrature axis and In-phase axis.

6. The storage medium of claim 5, wherein the allocating the bits allocates bits so that the bit difference between all the adjacent symbols forming a decision boundary is 1 bit or 2 bits.

7. The storage medium of claim 5, wherein the allocating the bits allocates bits so that a Hamming distance between all the adjacent symbols becomes a minimum value.

8. The storage medium of claim 5, wherein the allocating the bits allocates bits according to following Equations 10 to 14 for the first to fifth bits, respectively.

$b_{i,h}=0$, if $s_i \in \{R_1 \cup R_2\}$, $i=1, 2, \ldots, 32$ $b_{i,h}=1$, if $s_i \in \{R_3 \cup R_4\}$, $i=1, 2, \ldots, 32$ [Equation 10]

$b_{i,h}=0$, if $s_i \in \{R_1 \cup R_4\}$, $i=1, 2, \ldots, 32$ $b_{i,h}=1$, if $s_i \in \{R_2 \cup R_3\}$, $i=1, 2, \ldots, 32$ [Equation 11]

$A=\text{sort}(r_i | r_i \in R_1) = [\alpha_1\, \alpha_2 \ldots \alpha_8]$ $b_{i,h}=0$, if $r_i \in \{\alpha_1 \ldots \alpha_4\}$, $i=1, 2, \ldots, 32$ $b_{i,h}=1$, otherwise [Equation 12]

$B=\text{sort}(r_{i\_Q} | r_i \in R_1) = [b_1\, b_2 \ldots b_8]$.

$b_{i,h}=0$, if $r_{i\_Q} \in \{b_5 \ldots b_8\}$, $i=1, 2, \ldots, 32$ $b_{i,h}=1$, otherwise [Equation 13]

$C=\text{sort}(r_{i\_I} | r_i \in R_1) = [c_1\, c_2 \ldots c_8]$ $b_{i,h}=0$, if $r_{i\_I} \in \{c_4 \ldots c_7\}$, $i=1, 2, \ldots, 32$ $b_{i,h}=1$, otherwise [Equation 14]

(where $s_i$ represents an i-th symbol, $b_{i,h}$ represents an h-th symbol of the i-th symbol, and $R_k$ is defined by following Equation 15, $R_k = [s_{8k-7}\, s_{8k-6}\, s_{8k-5}\, s_{8k-4}\, s_{8k-3}\, s_{8k-3}\, s_{8k-1}\, s_{8k}]$, $k=1, \ldots, 4$ [Equation 15]

$r_i$, $r_{i\_Q}$, $r_{i\_1}$ represent a size of the i-th signal, a Quadrature axis size of the i-th signal, and an In-phase axis size of the i-th signal, respectively, and $A=[a_1\, a_2 \ldots a_8]$, $B=[b_1\, b_2 \ldots b_8]$, $C=[c_1\, c_2 \ldots c_8]$ represent a set rearranged by a size $r_i$ of signals belonging to $R_1$, a Quadrature axis size $r_{i\_Q}$, and an In-phase axis size $r_{i\_I}$, respectively, in an ascending order).

* * * * *